July 22, 1947.  H. E. HAYNES  2,424,312
AVERAGE VALUE VOLTAGE MEASURING DEVICE
Filed April 25, 1946
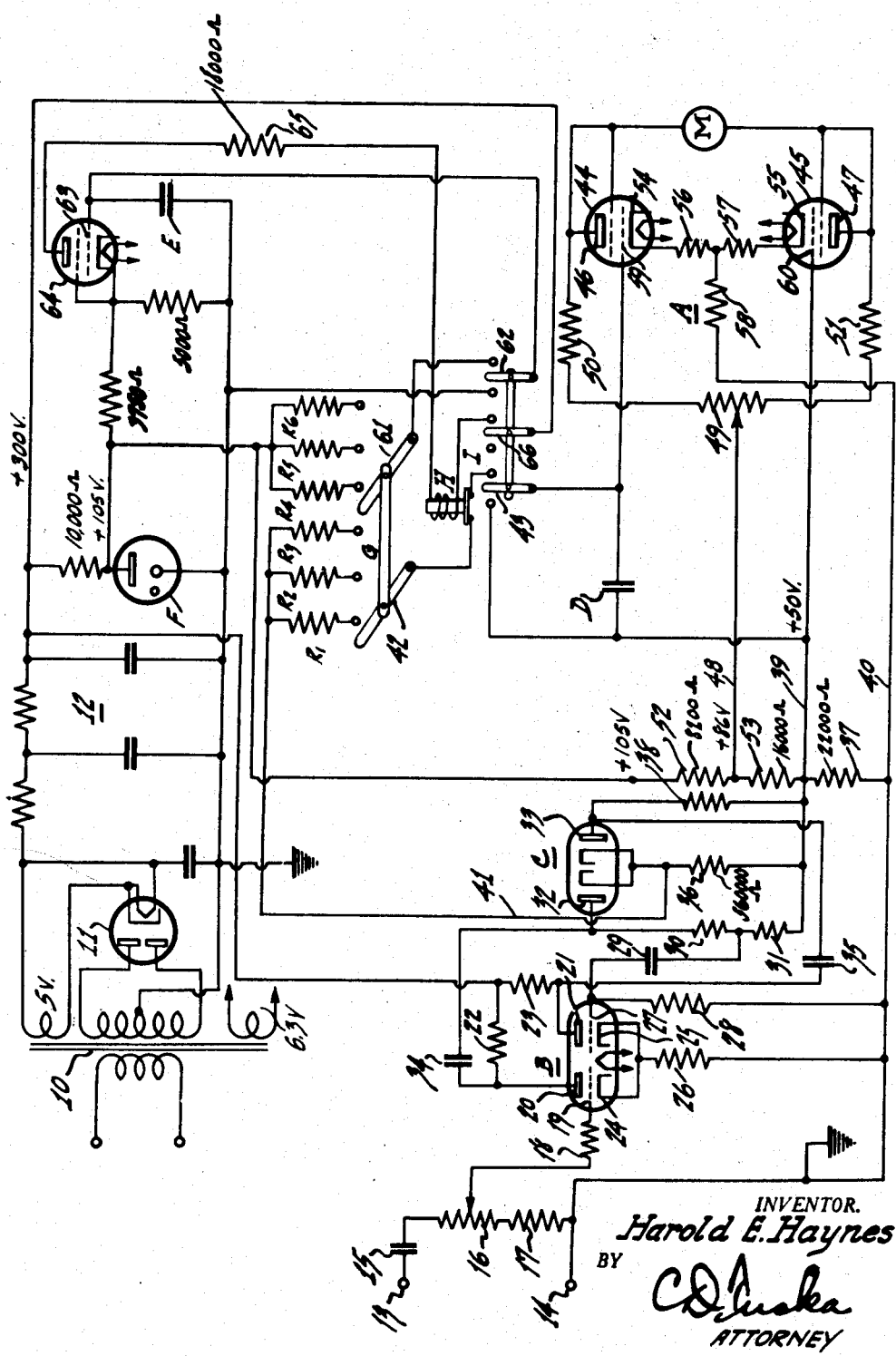
INVENTOR.
Harold E. Haynes
BY
C D Luska
ATTORNEY Patented July 22, 1947

2,424,312

UNITED STATES PATENT OFFICE 2,424,312

AVERAGE VALUE VOLTAGE MEASURING DEVICE

Harold E. Haynes, Indianapolis, Ind., assignor to Radio Corporation of America, a corporation of Delaware Application April 25, 1946, Serial No. 664,762

6 Claims. (Cl. 171—95)

This invention relates to measuring devices such as are designed to measure and indicate the average value of an applied voltage over predetermined intervals of time, and has for its principal object the provision of an improved measuring device and method of operation whereby the time interval over which the applied voltage is averaged or integrated may be readily adjusted to different values.

Many of the alternating voltages which it is desirable to evaluate fluctuate at rates easily perceptible to the human senses. Examples of such voltages are ground noise in film recordings of sound, surface noise and turntable rumble in disk recording of sound, ambient noise of various kinds, and voltages proportional to speed variations in sound recording and reproducing apparatus. The purpose of making such measurements is usually to help in analyzing the defects in equipment and processes that produce such undesired or extraneous noise.

The ordinary indicating meter requires that the observer do some of the necessary averaging mentally. If the amplitude of the voltage being measured is fluctuating quite widely at frequencies in the range of 0.5 to 10 cycles per second, for example, interpretation of the meter's action is likely to be troublesome and the subject of disagreement between different observers. It is therefore desirable that there be available an integrating meter which measures volt-seconds for a time interval of appropriate length and registers only a single value which is proportional to the average amplitude of the applied voltage during the selected interval.

The present invention provides such an integrating meter in a form which includes (1) a direct current voltmeter A, (2) a voltage amplifier and phase inverter B and a full wave rectifier C for deriving a unidirectional voltage proportional in value to the amplitude of the voltage to be measured, (3) a capacitor D which is responsive to this unidirectional voltage and applies to the direct current voltmeter A a potential dependent on its accumulated charge, (4) a timing capacitor E which is charged by a constant voltage regulated by a regulator F, (5) a switch G which is movable to three different closed positions for selecting different time intervals during which potential proportional to the measured voltage is applied to the direct current meter A, and (6) a relay H which is opened to interrupt charging of the capacitor D when the charge of the timing capacitor E attains a value which is predetermined by the setting of the switch G.

Important objects of the invention are the provision of an improved measuring device of the integrating type, and the provision of improved means for selecting the time interval during which a measuring device has applied to it a quantity to be measured.

The invention will be better understood from the following description considered in connection with the accompanying drawing and its scope is indicated by the appended claims.

The single figure of the drawing is a wiring diagram of the improved measuring device.

Power for operating this device is derived from a socket power unit which includes a transformer 10, a rectifier 11 and a filter 12. Cathode heating current for the various tubes of the measuring device may be derived from a 6.3 v. secondary winding.

The voltage to be measured is applied from the input terminals 13—14 through a capacitor 15 to the resistors 16 and 17, and from an adjustable terminal of the resistor 16 is applied through a resistor 18 to the grid 19 of the voltage amplifier and phase inverter B.

The voltage amplifier and phase inverter B is of a conventional type. Potential is applied to its anodes 20 and 21 from the +300 v. lead through resistors 22 and 23 respectively, its two cathodes 24 and 25 are grounded through a common resistor 26. Its control grid 27 is supplied with a voltage having the opposite phase of the voltage applied to grid 19, and of a magnitude suitably reduced by the voltage divider consisting of resistors 30 and 31 to produce an output voltage at plate 21 equal to that appearing at plate 20 and of opposite phase.

The rectifier C has its anodes 32 and 33 coupled respectively through a capacitor 34 to the anode 20 and through a capacitor 35 to the anode 21 so that a more negative potential is applied to the anode 32 in response to the positive half cycle of the input voltage and a more negative potential is applied to the anode 33 in response to the negative half cycle of the input voltage. The cathodes of the rectifier C are connected to ground through a resistor 36 and a resistor 37 and its anode 33 is connected through a resistor 38 to the common terminal of the resistors 31, 36 and 37. With these connections, the anode 33 is more positive during the positive half cycle of the input voltage and the anode 32 is more positive during the negative half cycle of the input voltage. The rectifier C is of the averaging type but could be of the peak-reading or some other type if desired. Its negative lead 39 is about 50 volts positive with respect to the negative lead 40 of the direct current meter A. Its positive lead 41 is connected through one of the resistors $R_1$, $R_2$, or $R_3$, the left hand blade 42 of the switch G, the contacts of the relay H and the blade 43 of a control switch I to one terminal of the capacitor D.

Under these conditions, each cycle of the input voltage produces at the capacitor D a charge which is proportional to its amplitude so that the total charge of this capacitor and the voltage between its terminals is proportional to the average value of the applied voltage during the selected period if the time constant of resistor $R_1$, $R_2$, or $R_3$, in combination with capacitor D is much longer than the period of time over which the measurement takes place.

The direct current voltmeter A includes a pair of electron discharge devices 44 and 45 which have potential applied to their anodes 46 and 47 from a lead 48 respectively through the upper part of a resistor 49 and a resistor 50 and through the lower part of the resistor 49 and a resistor 51. The lead 48 is connected through a resistor 52 to the high voltage side of the voltage regulator F and through a resistor 53 to the lead 39. The cathodes 54 and 55 of the devices 44 and 45 are connected to a common point through resistors 56 and 57 and from this common point through a resistor 58 to ground.

With these connections, there is applied to the grid 59 of the device 44 a resultant potential which has as its components the voltages across the resistors 56, 58 and 37 and the voltage of the capacitor D. The potential of the grid 60 of the device 45 is made up of the voltages across the resistors 57, 58 and 37. The potential difference resulting at the anodes 46 and 47 when there is a charge on the capacitor D is indicated by a meter M.

In the standby condition of the measuring device, the control switch I is closed to the left thus short circuiting and discharging the capacitors D and E.

The measuring device is put into operation by (1) applying the voltage to be measured to the terminals 13—14, (2) setting the switch G to one of its closed positions, and (3) moving the control switch I to its right hand closed position. Under these conditions, the charge on the capacitor increases for each half cycle of the applied voltage and the capacitor E is charged through one of the resistors $R_4$, $R_5$, or $R_6$, the right hand blade 61 of the switch G and the right hand blade 62 of the switch I at a rate determined by the value of the resistor $R_4$, $R_5$ or $R_6$ connected in the charging circuit. As the charge of the capacitor E increases, the potential of the grid 63 of a tube 64 becomes more positive until this tube begins to conduct current through a circuit including a resistor 65, the relay H and a blade 66 of the switch I. When ths happens, the relay H opens thus breaking the charging circuit of the capacitor D. When the meter M has been read, the switch I is moved to its left hand closed position thus discharging the capacitors D and E and returning the meter reading to zero.

It will be noted (1) that both the timing circuit and the direct current voltmeter are energized from the regulated voltage supply provided by the regulator F thus excluding extraneous variations and (2) that accuracy of the timing circuit is determined almost altogether by the resistance and capacitor values for the reason that the critical bias voltage of the tube 64 is a small fraction of the voltage to which the capacitor E must be charged before the relay H is opened. For example. the tube 64 may be of the 2050 type which has a critical grid voltage of about $-1.5$ volts, the capacitor E may have a capacitance of 1 microfarad, and the resistors $R_4$, $R_5$ and $R_6$ may have values of 2.27 megohms, 1.95 megohms and 6.32 megohms. The capacitor D may have a capacitance 5.1 microfarads and the resistors $R_1$, $R_2$, and $R_3$ resistances of 7.75 megohms, 6.63 megohms and 21.5 megohms respectively. These resistor values are such as to make the direct current voltmeter calibration the same for all time intervals.

The present invention thus provides an integrating voltmeter which operates with a high degree of precision and is readily adjusted to integrate a voltage over time intervals of different length.

I claim as my invention:

1. The combination of means for producing unidirectional pulses proportional to the successive cycles of an alternating potential to be measured, current storage means, a direct current meter having an input circuit responsive to the potential of said storage means, means for predetermining the rate at which current is stored in said storage means by said unidirectional pulses, means for interrupting the storing of said current in said storage means, and means operated simultaneously with said rate determining means for predetermining the time at which said interrupting means is operated to terminate the storage of said current.

2. The combination of means for producing unidirectional pulses, means for storing current in response to said pulses, means for limiting the storing of said current to a predetermined time interval, and means for simultaneously adjusting the length of said time interval and the rate at which said current is stored in said storage means.

3. The combination of means for producing unidirectional pulses, a first capacitor for storing current in response to said pulses, means including a second capacitor for limiting the storing of said current to a predetermined time interval, constant voltage means for charging said second capacitor, and means for simultaneously adjusting the rates at which said capacitors are charged.

4. The combination of means for producing unidirectional pulses, a first capacitor for storing current in response to said pulses, means including a second capacitor for limiting the storing of said current to a predetermined time interval, constant voltage means for charging said second capacitor, and means for simultaneously adjusting the rates at which said capacitors are charged, and means for simultaneously discharging said capacitors.

5. The combination of means for producing unidirectional pulses, a first capacitor for storing current in response to said pulses, means including a second capacitor for limiting the storing of said current to a predetermined time interval, constant voltage means for charging said second capacitor, separate groups of resistors for determining the rates at which said capacitors are charged, and means for simultaneously selecting a resistor in each of said groups.

6. The combination of means for producing unidirectional pulses, means for storing current in response to said pulses, means for limiting the storing of said current to a predetermined time interval, and means for simultaneously adjusting the length of said time interval and the rate at which said current is stored in said storage means, and means for indicating the potential of said storage means.

HAROLD E. HAYNES.